Aug. 19, 1969    E. L. MEYER    3,461,748
METHOD OF MAKING A BROACHING TOOL
Filed May 10, 1966    5 Sheets-Sheet 1

INVENTOR.
EDWIN L. MEYER
BY
Smythe & Moore
ATTORNEYS.

INVENTOR.
EDWIN L. MEYER
BY
*Smythe & Moore*
ATTORNEYS.

Aug. 19, 1969  E. L. MEYER  3,461,748
METHOD OF MAKING A BROACHING TOOL
Filed May 10, 1966  5 Sheets-Sheet 3

INVENTOR.
EDWIN L. MEYER
BY
*Smythe & Moore*
ATTORNEYS.

Aug. 19, 1969    E. L. MEYER    3,461,748
METHOD OF MAKING A BROACHING TOOL
Filed May 10, 1966    5 Sheets-Sheet 4

INVENTOR.
EDWIN L. MEYER
BY
Smythe & Moore
ATTORNEYS

Aug. 19, 1969  E. L. MEYER  3,461,748

METHOD OF MAKING A BROACHING TOOL

Filed May 10, 1966  5 Sheets-Sheet 5

INVENTOR.
EDWIN L. MEYER
BY
Smythe & Moore
ATTORNEYS.

United States Patent Office 3,461,748
Patented Aug. 19, 1969

3,461,748
METHOD OF MAKING A BROACHING TOOL
Edwin L. Meyer, 376 Cleveland Ave.,
Bridgeport, Conn. 06604
Filed May 10, 1966, Ser. No. 549,055
Int. Cl. B23k *21/00*
U.S. Cl. 76—101                           3 Claims

ABSTRACT OF THE DISCLOSURE

A multiple rotary broaching tool and method of making wherein thin flat blades are assembled in a machining block at one angle and placed in a working block with separators therebetween, the blades being at a different angle to provide a "backoff" angle. In one form, there is a skiving blade at the forward end substantially at right angles to the path of travel of the assembly of the other blades which are angularly displaced relative thereto.

---

This invention relates to a multiblade tool for reciprocation relative to a rotating workpiece and the method of making the same.

In prior practice, such tools have been made from a plurality of blades held apart by various positioning means. The blades can be arranged in a holding block movable relative to the tool, each succeeding blade being slightly higher as in broaching tools. These blades have normally had straight cutting edges. Where there is an irregular form or configuration with a multiplicity of radii or grooves, it has not been possible to grind them efficiently or to form the blades with facility so as to obtain the required backoff clearance. Backoff clearance or angle may be defined as the relief angle, rake or clearance angle of the tool.

One of the objects of the invention is to provide a multiblade tool and method of efficiently forming the cutting edges of the blades of said multiblade tool so as to obtain the proper backoff angle.

Another object of the invention is to provide a method of forming a complex shaped series of blades for use in conjunction with a multiblade tool arrangement wherein a succeeding blade has its cutting edge slightly above the preceding blade.

Another object of the invention is to provide a tool and method of making it in a simpler manner wherein a plurality of blades is held in a block which is moved past a rotating workpiece.

In one aspect of the invention, a bar of high speed steel or metal can be cut into the proper lengths for each cutter blade. A plurality of tool blades are gathered and mounted in a machining fixture in contact with each other, the blades being held as a cluster at a predetermined angle relative to the path of the machining tool. This is at the same angle as they will be placed in the work block. The machining tool may, for example, be a grinding wheel of the proper contour for the edges being ground or formed. The cluster is arranged so that the flat sides of the bars are held at a predetermined angle relative to the travel of the forming or grinding tool. After grinding, the blades are placed in a work block which is reciprocable relative to the rotating workpiece. The work block is arranged so that the angle at which the blades are held is slightly less than that at which they were held while being ground so as to provide the proper backoff angle.

The work block, if desired, may have a skiving or roughing tool at the forward part arranged parallel to the axis of the rotating workpiece. In use, the skiving tool is brought into line with the axis of the work and then is raised the desired amount to make a first or roughing cut. The work block is then reciprocated forwardly to bring the first of the blades into contact with the workpiece. The multiblade tools are angularly disposed relative to the axis of the work block so as to obtain the desired cutting angle relative to the rotating workpiece. The cutting edges of each of the blades are made slightly higher than the preceding blade so that as the work block is advanced, successively deeper cuts will be taken. Alternatively, the blades may be of the same elevation. The cutting action may be termed a "rotary broaching" action.

In a still further aspect of the invention, a keyway may be formed on the bottom surface of the blades to cooperate with a key in the machining block. A similiarly placed key is also provided in the work block.

In a still further aspect of the invention, the spacer plates may be contoured to the general form of the cutter blades. This is particularly true of the leading corner of a blade.

These and other objects, advantages and features of the invention will become apparent from the following description and drawings.

The blades may be made of strips of metal suitably selected for the material to be cut. Various metals can be machined such as steel, brass, aluminum, plastics, etc. Various types of machines can be used for the purpose of rotating the workpiece and traversing the work block and cutting blades past the workpiece, an example thereof being a milling machine.

Figure 8:
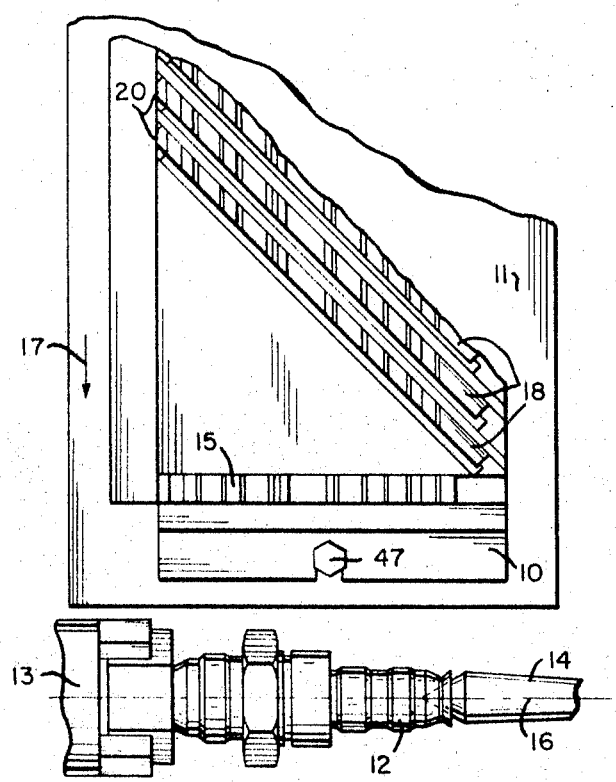
FIG. 8 is a fragmentary top view of the blades located in the work block or reciprocable block.
Figure 9:
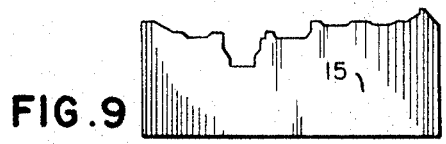
FIG. 9 is a front view of one form of skiving blade.
Figure 10:
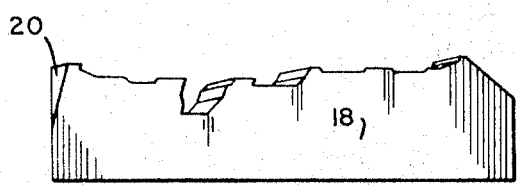
FIG. 10 is a front view of one of the formed multi-blades.

Referring to FIG. 8, work block 10 is fastened to the reciprocable table 11 of the machine being used for the purpose by bolts 47. Workpiece 12 is supported between chuck 13 and center 14 of the machine, the chuck 13 being rotatably driven. As the table 11 is moved past the rotating workpiece 12, skiving tool 15 will first come in contact or in line therewith along the axis 16 of the workpiece 12. Table 11 then is raised upwardly the amount of the roughing or skiving cut to be taken. After the predetermined skiving cut has been made, table 11 is then transversely moved in the direction of arrow 17 so that succeeding blades 18 come into contact therewith. As will be described later, blades 18 have their cutting edges formed so as to produce the desired configuration or contour of workpiece 12. FIG. 9 shows one form of skiving blade used to produce the connector 12, and FIG. 10 shows the corresponding cutting blade of the multiblade portion of the assembly. These are merely for illustrative purposes.

The cutter blanks can be cut from a bar of steel to a suitable length as required, the blades being heat-treated to the desired cutting tool hardness and then the flat surfaces ground or formed to correct size. Also, the narrow faces or bottom and top surfaces can be sized as needed. In the particular embodiment described, the main cutting blades are arranged so as to have an angle of 45° with the axis of the rotating workpiece.

Figure 1:
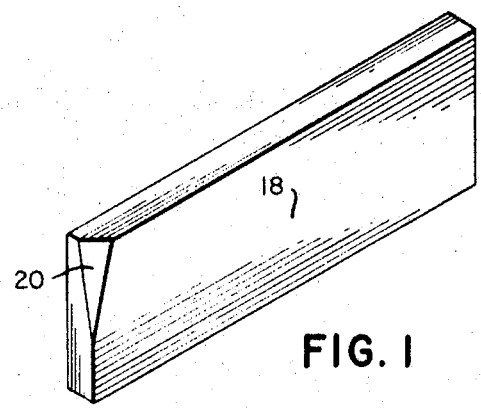
FIG. 1 shows a single cutter blade.

In order to properly locate the blades, the edge or corner 20 (FIG. 1) must be ground so that when the blades are set onto the surface 21 of machining block 19, the angle of the face of the bars can be made 20° with the vertical, or some suitable angle. Such is accomplished by suitably shaping surfaces 22, 23 of the holding or machining block 19 or by other suitable means.

Figure 2:
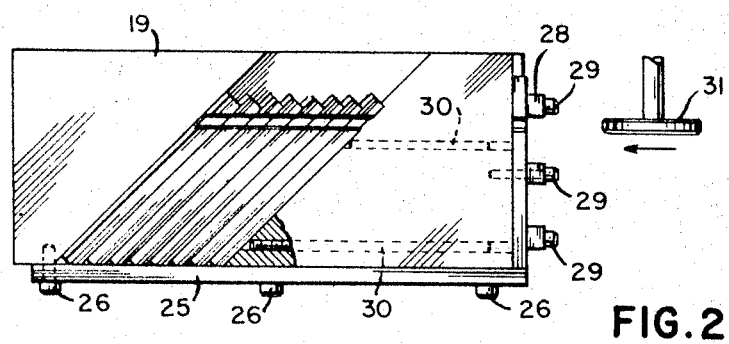
FIG. 2 is a top view of the machining or grinding block.
Figure 3:
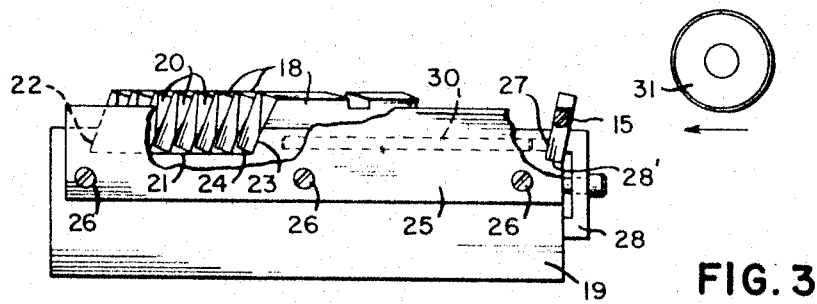
FIG. 3 is a view looking from the side of FIG. 2 before the blades have been shaped.

The botom edge or surface 24 of the cutter blade 18 is formed at a right angle to the faces of the cutting bars. A gauge or positioning bar 25 (FIGS. 2, 3, 4) is fastened by screws 26 to the machining block 19, the corner faces 20 of the cutter bars being placed in abutting relationship to the positioning bar 25.

The skiving blade 15 is placed at the forward surface 27 and surface 28' of the machining block 19. Holding clamp 28 can be fastened in place by screws 29 to hold the skiving bar in proper position. As an example, the face of the skiving cutter 15 can be made 12° with the vertical. Screws 30 are employed to hold the cluster of cutter blades in firm position in any desired manner.

The forming tool or grinding wheel, shown schematically at 31, then is reciprocated across the cluster of blades to form the desired configuration thereof. The grinding wheel 31, as mentioned previously, must be formed to the proper shape in accordance with the configuration to be generated.

Figure 6:
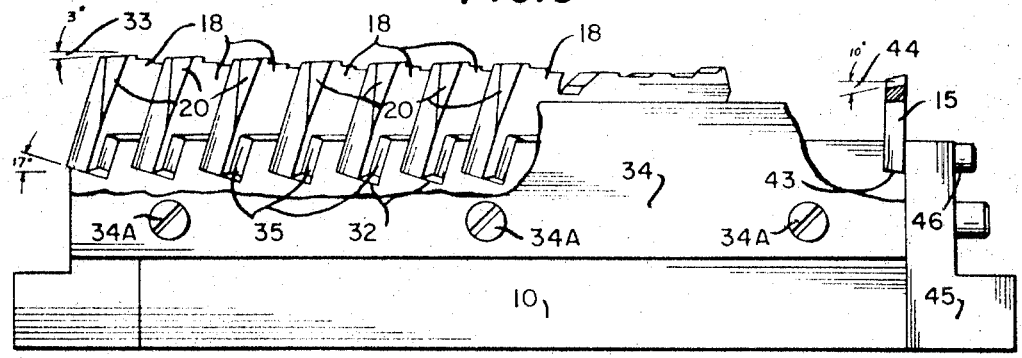
FIG. 6 is an enlarged view partially broken away, looking fom the side of FIG. 5.

After the cutter blades have had the cutting surface machined thereon, they are removed from the machining or holding block 19. The work block 10 has slots 32 thereacross. The floors upon which the bottom surfaces of the cutter blades rest are at an angle less than the angle at which the blades are placed in the grinding block. As an example, if it is made 17° (FIG. 6), then when the right angled bottom face of the cutter blades is placed thereon, the backoff angle 33 will be 3°. In other words, the blades are placed at a lesser angle in the work block 10 than they were when in the grinding block 19 so that the top surface will have the desired clearance or backoff angle. The blades are put in place so that the corners 20 thereof are in contact with removable positioning bar 34, this bar corresponding to positioning bar 25 of the machining block 19.

Figure 7:
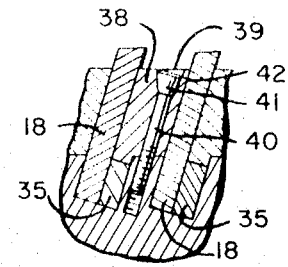
FIG. 7 is an enlarged view looking from the side of FIG. 6, showing one form of securing means.

Tapered wedges 35 (FIGS. 6, 7) are then driven in so as to hold each cutter blade in its slot 32. The holding supporting member 38 is then inserted between each blade, said holding member having holding screw holes 39 suitably spaced for receiving holding screws 40, said holding screws having a tapered head 41 which forces the upper part of the metal, such as at 42, outwardly against the adjacent blades.

The skiving blade 15 can be placed at the forward end of the work block 10, the floor 43 being at a lesser angle relative to the block than when the blade was originally machined in the machining block 19. As an example, this may be 2° which would result in a backoff clearance 44 of 10° if it was originally at 12°. Clamp 45 and screws 46 serve to hold the skiving blade in place.

Screws 34A and positioning bar 34 are then removed so as to provide a path for the shavings or chips.

Figure 4:
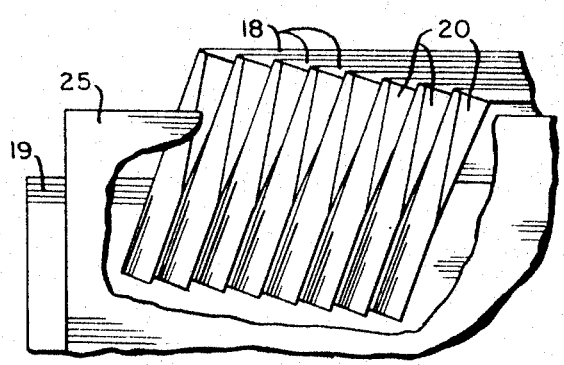
FIG. 4 is an enlarged fragmentary view of the edge of the blades with the blades all the same height and the steps are successively rised.
Figure 5:
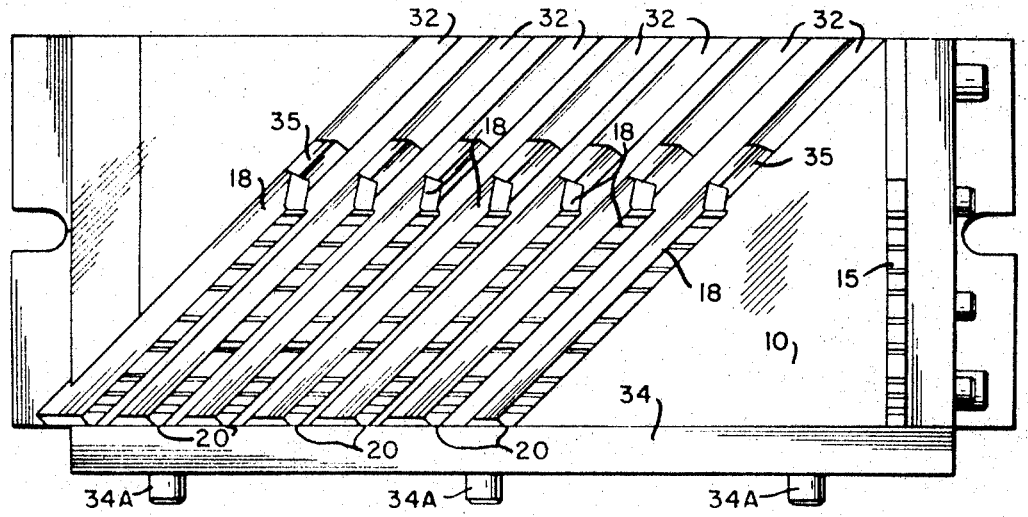
FIG. 5 is a top view of the work block with the shaped blades inserted therein for assembly purposes.

Instead of making the cutter blades of increasing height, it also is possible to make them all of the same height and changing the steps so that the surfaces are increasingly higher relative to the bottom of the work block. Such an arrangement is illustrated in FIG. 4.

The work block 10 then can be fastened by suitable means, such as bolts 47, to the reciprocating table 11 of the machine tool. The workpiece is rotated and the table 11 moved relative thereto as described.

Figure 14:
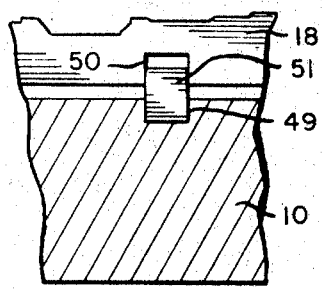
FIG. 14 is a fragmentary sectional view looking in the direction along the line 14—14 of FIG. 13.

In addition to the positioning guide 25, a keyway 49 (FIGS. 11 and 12) may be formed in the base of the machining block 19. The blades 18 previously have had a keyway 50 cut across the bottom surface of the cluster. A key 51 is inserted in the keyway 49 so as to position the blades therein in conjunction with the positioning bar 25. The work block 10 (FIGS. 13 and 14) also has a similar keyway and key for locating the cutter blades in the work block in cooperation with the positioning bar 25.

As the work block 10 advances relative to the rotating workpiece, the shavings or chips will move along the space between the cutter blades to the side of the table. It has been found that a clean cut is made with the arrangement.

Sufficient space is needed between each cutter blade on the work block to allow room for chip freedom as the cutters advance into the workpiece. The number of blades used to reduce a part to its desired configuration will depend on the amount of reduction of size of the workpiece required. It also is possible to take more than one pass of the work block 10 and its assembled cutter blades when a large reduction in size is needed. In other words, the pass can be repeated any number of times as required. Each blade, as an example, may be 0.015" higher than the preceding one. The angles and such height will depend upon the materials being used.

It has been found that it is desirable in some instances to provide a contoured back-up plate and separator plates as illustrated in FIGS. 15 to 18, inclusive.

Work block 60 has blades 61 mounted thereon between end pieces 62, 63, said end pieces being fastened to block 60. At the back end of the assembly, back-up plate 64 can be shaped so that its upper face follows generally the curvature of the last blade. The intermediate separator or supporting plate 65 have the leading edge backing portion 66 close to the tip 67 of the blades so as to prevent damage thereto. The portion 68 must be shaped so as to permit the chips to flow therealong between the blades.

Screws or bolts 69 in end block 63 will serve to tighten the assembly.

In place of the holding screws 47 (FIG. 7), the top edges 70 of the separator plates may be staked over so as to result in a tight fit between blades.

Figure 11:
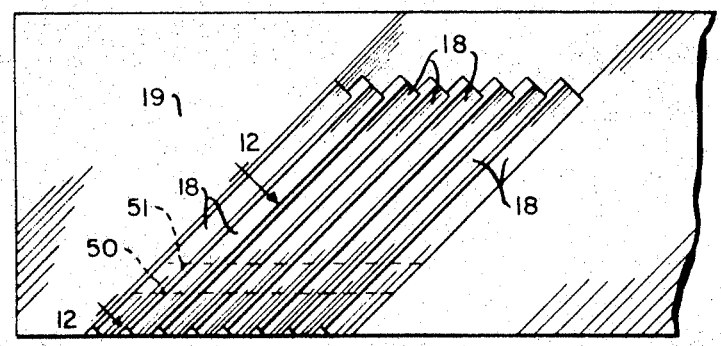
FIG. 11 is a fragmentary plan view of the machining block, showing an alternative arrangement with a keyway.
Figure 12:
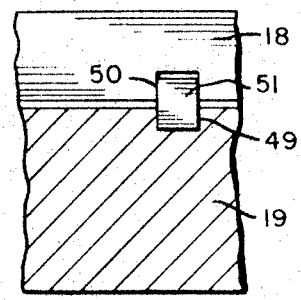
FIG. 12 is a fragmentary sectional view looking in the direction along the line 12—12 of FIG. 11.
Figure 13:
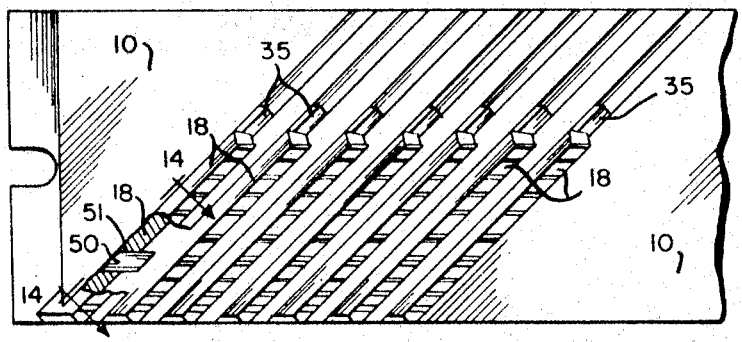
FIG. 13 is similar to FIG. 11 except that it shows the cutter blades in the work block.
Figure 15:
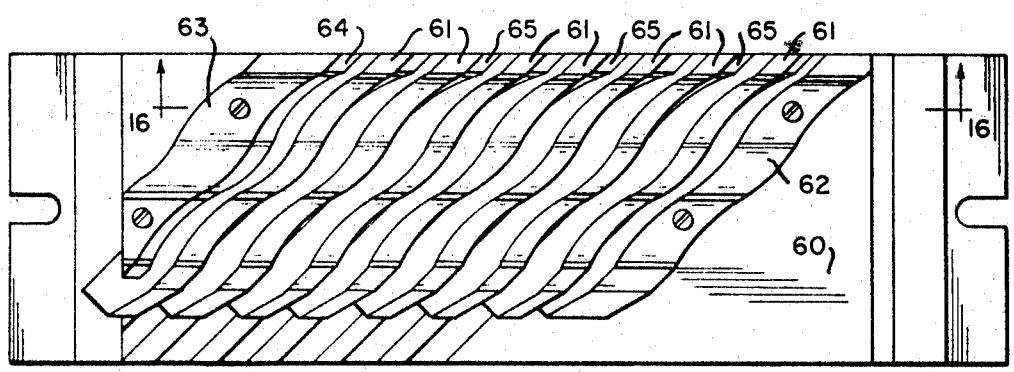
FIG. 15 is a plan view of a work block with contoured blades and spacer plates.
Figure 16:
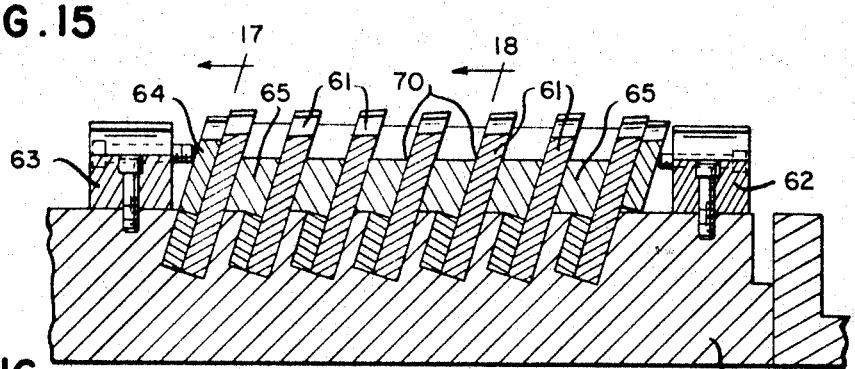
FIG. 16 is a section along the line 16—16 of FIG. 15.
Figure 17:
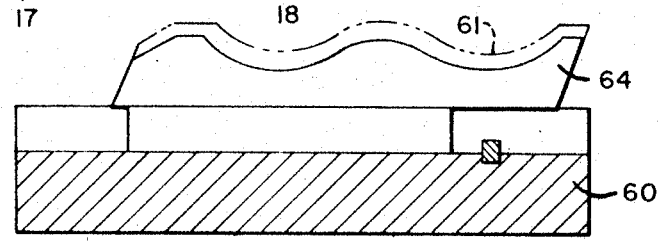
FIG. 17 is a view in the direction along the line 17—17 of FIG. 16.
Figure 18:
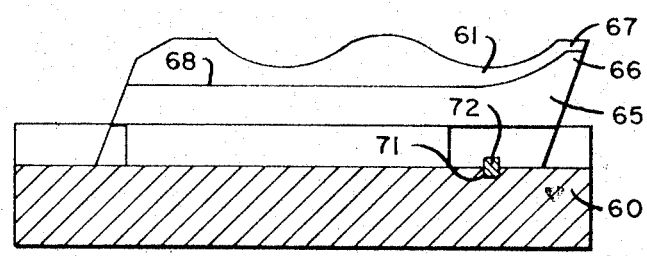
FIG. 18 is a view in the direction along the line 18—18 of FIG. 16.

Keyway 71 and key 72 may be used as in FIGS. 11 to 13, inclusive, and the blades formed accordingly.

When it is necessary to sharpen the blades, they can be taken out of the work block, put on a surface grinder and reinstalled in a simple manner, the sharpening being on the face only, the form itself not being changed.

The method hereof permits making of the formed cutter blades at low cost and obtains the proper backoff clearance when installed in the work block in a simple manner. As a result, it makes possible application of the techniques described herein to a wider variety of uses which were not feasible prior hereto.

It should be apparent that variations may be made in the details of the method and the tool without departing from the spirit of the invention except as defined in the appended claims.

What is claimed is:
1. The method of making a broaching tool comprising the steps of forming a plurality of thin tool blanks, placing said blanks in a machining fixture and holding the same therein as a cluster at a predetermined angle relative to the path of a machining tool, one of said blades being substantially at right angles to the grinding wheel and the remainder at substantially 45°, machining a configuration on the edges of said blanks to provide machined blades, said edges having face portions at said predetermined angle to the faces of said machined blades, and placing said machined blades in a work block in the same angular relationship as in said machining fixture and so that the faces thereof are at a smaller angle relative to the rectilinear path so as to provide the desired backoff clearance.

2. The method of making a cutting tool according to claim 1 wherein one of the blanks is held at substantially right angles to the machining tool and the remainder at substantially 45°, said first mentioned blank being positioned in front of and spaced from the remainder thereof.

3. The method of making a cutting tool according to claim 1 wherein the blanks are located when being machined and in the tool holder by means of a predeterminedly located key means.

References Cited

UNITED STATES PATENTS

| 1,874,536 | 8/1932 | Irwin | 76—101 |
| 2,044,494 | 6/1936 | Bullard | 29—95.1 X |
| 2,044,495 | 6/1936 | Bullard | 29—95.1 X |
| 2,057,303 | 10/1936 | Gstyr | 51—288 |
| 2,173,074 | 9/1939 | Romaine | 29—95.1 |
| 2,181,396 | 11/1939 | Edgar | 51—288 |
| 2,204,537 | 6/1940 | Lapointe | 29—95.1 |
| 2,439,822 | 4/1948 | Phaneuf | 29—95.1 |
| 2,538,844 | 1/1951 | Nimz | 29—95.1 |
| 2,585,990 | 2/1952 | Baldenhofer | 51—288 X |
| 3,126,611 | 3/1964 | Wiles | 29—95.1 |

FOREIGN PATENTS

| 667,286 | 11/1938 | Germany. |
| 147,428 | 10/1962 | U.S.S.R. |

BERNARD STICKNEY, Primary Examiner

U.S. Cl. X.R.
29—95.1; 51—288